United States Patent
Kunnath et al.

(10) Patent No.: US 11,546,284 B2
(45) Date of Patent: *Jan. 3, 2023

(54) OFFLINE EMAIL SYNCHRONIZATION

(71) Applicant: VMware, Inc., Palo Alto, CA (US)

(72) Inventors: Ramanandan Nambannor Kunnath, Bangalore (IN); Nikhil Jere, Bangalore (IN)

(73) Assignee: VMware, Inc., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/319,475

(22) Filed: May 13, 2021

(65) Prior Publication Data
US 2021/0328959 A1    Oct. 21, 2021

Related U.S. Application Data

(63) Continuation of application No. 16/200,784, filed on Nov. 27, 2018, now Pat. No. 11,025,577.

(51) Int. Cl.
*H04L 51/42* (2022.01)
*H04W 4/14* (2009.01)
*H04L 7/00* (2006.01)
*H04L 67/306* (2022.01)
*H04L 51/224* (2022.01)

(52) U.S. Cl.
CPC ............ *H04L 51/42* (2022.05); *H04L 7/0008* (2013.01); *H04L 51/224* (2022.05); *H04L 67/306* (2013.01); *H04W 4/14* (2013.01)

(58) Field of Classification Search
None
See application file for complete search history.

(56) References Cited

U.S. PATENT DOCUMENTS

| 6,424,828 | B1* | 7/2002 | Collins | H04W 8/26 455/445 |
|---|---|---|---|---|
| 2005/0197142 | A1* | 9/2005 | Major | H04L 51/58 455/466 |
| 2007/0283039 | A1* | 12/2007 | Kim | H04L 51/066 709/238 |
| 2008/0085728 | A1 | 4/2008 | Reding | |
| 2008/0280644 | A1* | 11/2008 | Hugot | H04L 63/0853 709/206 |

(Continued)

*Primary Examiner* — Chris Parry
*Assistant Examiner* — Abderrahmen Chouat
(74) *Attorney, Agent, or Firm* — Clayton, McKay & Bailey, PC

(57) ABSTRACT

Examples described herein include systems and methods for performing email synchronization in situations where mobile-device connectivity is lacking. The mobile device can send an SMS message to an email notification server requesting email synchronization and the email notification server can request synchronization with the email server associated with the user's email account. After receiving an email from the email server, the email notification server can encrypt the email and break it into various chunks, with each chunk including a header having identifying information. The chunks can be transmitted as SMS messages to the mobile device. The email application can retrieve the SMS messages, decrypt them, and reconstruct the email. The email application can then display the email for the user.

20 Claims, 5 Drawing Sheets

(56) References Cited

U.S. PATENT DOCUMENTS

| | | | |
|---|---|---|---|
| 2010/0250929 A1* | 9/2010 | Schultz | H04L 63/083 |
| | | | 713/168 |
| 2011/0040974 A1* | 2/2011 | Kaplan | H04L 51/00 |
| | | | 713/176 |
| 2011/0173438 A1* | 7/2011 | Matzkel | H04L 63/0428 |
| | | | 713/150 |
| 2013/0151636 A1* | 6/2013 | Majeti | H04L 51/18 |
| | | | 709/206 |
| 2013/0286952 A1 | 10/2013 | Ghosh | |
| 2014/0185806 A1* | 7/2014 | Mardikar | H04W 12/06 |
| | | | 380/270 |
| 2014/0310514 A1* | 10/2014 | Favero | G06F 21/43 |
| | | | 713/153 |
| 2017/0061138 A1* | 3/2017 | Lambert | H04L 63/18 |
| 2018/0054447 A1* | 2/2018 | Greevy | H04L 63/1408 |
| 2018/0083935 A1* | 3/2018 | Fang | H04W 4/14 |
| 2020/0162539 A1* | 5/2020 | Ziv | H04L 45/563 |

\* cited by examiner

OFFLINE EMAIL SYNCHRONIZATION

This application is a continuation of U.S. patent application Ser. No. 16/200,784, titled "OFFLINE EMAIL SYNCHRONIZATION" and filed Nov. 27, 2018, which is incorporated herein in its entirety for all purposes.

BACKGROUND

Mobile devices typically provide access to a user's email account through an email application that executes on the device. An email application can synchronize with the email account to send or receive emails, ensuring that the email application remains up to date. The synchronization process can occur periodically or based on a notification received at the mobile device. But email synchronization can be resource intensive, sometimes requiring more bandwidth than other processes carried out on the mobile device.

In situations where a mobile device lacks connectivity, the email synchronization process is cancelled or delayed. Even a partial lack of connectivity can disrupt email synchronization. Email synchronization can also be disrupted when a user is traveling internationally or when they intentionally turn off cellular data. Meanwhile, other processes on a mobile device may still work with only partial connectivity. A known strength of text messaging using a Short Message Service ("SMS") message, for example, is that the messages can be sent to and received from a mobile device with almost any level of minimal connectivity. As a result, even when a device is "offline" for purposes of an email application, the device can still potentially send and receive SMS messages.

SMS messages themselves have many limitations, such as a strict character limit (typically 160 characters) and a lack of integration with other communication forms that may be present on a mobile device. For example, if a user is unable to send an email, it would be difficult to send that same email with SMS due to the character limits and other functional limitations. Similarly, if a user is unable to download a new email to their mobile device, SMS messaging is simply not an option for receiving that email.

As a result, a need exists for systems and methods that leverage low-connectivity forms of communication to perform email synchronization in situations where insufficient connectivity prevents normal email synchronization.

SUMMARY

Examples described herein include systems and methods for synchronizing email. In a first example, an email notification server receives a first SMS message from a mobile device requesting the email synchronization. The first SMS message can include information associated with the mobile device or its user, such as a user identification and phone number. In some examples, the first SMS message can be encrypted by an email application executing on the mobile device. The first SMS can be sent by, or on behalf of, the email application. For example, the email application can send the first SMS message based on a lack of connectivity sufficient to synchronize the email in a default manner.

The email notification server can receive an email associated with an email account of the user. The email can be received at the email notification server based on a request sent by the email notification server to an email server. The email server can store emails associated with the user's email account and can send and receive emails on behalf of the user. The email server can receive a request from the email notification server and can confirm that the user identification and phone number included in the first SMS message match records associated with the user. Any other information provided by the email notification server can also be verified before proceeding. After the verification, the email server can send one or more emails to the email notification server.

The email notification server can encrypt the email received from the email server. In some examples, the email notification server can use a key of a key pairing to encrypt the email. For example, the email notification server can use a key received in the first SMS message from the mobile device.

The email notification server can then break the encrypted email into various portions, or "chunks," in order to abide by the character limit for SMS messages. Each chunk can include a header portion that includes information relevant to reconstructing the email at the email client. For example, the header of each chunk can include a message identification indicating a particular email message to which the chunk applies, which can be relevant when sending multiple emails through SMS. The header can also include a sequence number assigned to the chunk, dictating the order in which the chunks should be combined during reconstruction. The header can also include a total number of chunks for the relevant email message.

The email application can receive the chunks from the email notification server and use them to reconstruct the email message. For example, the email application can use a key of a key pairing to decrypt each chunk. The email application can then use the information in the headers regarding the message identification, sequence number, and total chunk number to reconstruct the email message. The email application can then display the email message within the application, providing a seamless experience for the user. In some examples, the email application can intercept the SMS messages from the email notification server such that the user is not notified of the receipt of those messages, instead only being notified of the new email available in the email application.

The process of encrypting and chunking an email can also be performed by the email application in situations where a user wants to send an email but the mobile device's connectivity prevents the email application from doing so. In that example, the email application can encrypt the email message to be sent and then break it into multiple chunks. Each chunk can include a header that contains a message identification indicating the particular email message to which the chunk applies, a sequence number assigned to the chunk, and the total number of chunks for the email message. The mobile device can then transmit these chunks, using SMS messages, to the email notification server. The email notification server can decrypt the messages, reconstruct the email, and forward it to the email server for further processing.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples described herein include systems and methods for performing email synchronization in situations where mobile-device connectivity is lacking. Connectivity can be lacking for a variety of reasons. In one use case, the mobile device can only support a weak connection to a cellular tower. This can occur in remote areas, in buildings with heavy structural components that block wireless transmissions, or in areas overloaded with users, such as professional sporting events. In another use case, the user can be traveling outside of the country with a phone plan that allows for SMS messages to be sent and received but does not allow for other data transmission to and from local cellular towers. In yet another use case, the user may intentionally turn off their cellular data, such as when they reach their monthly data limit. In each case, the mobile device lacks cellular connectivity sufficient to synchronize an email application but is able to send and receive SMS messages.

The mobile device can send an SMS message to an email notification server requesting email synchronization and the email notification server can request synchronization with the email server associated with the user's email account. After receiving an email from the email server, the email notification server can encrypt the email and break it into various chunks, with each chunk including a header having identifying information. The chunks can be transmitted as SMS messages to the mobile device. The email application can retrieve the SMS messages, decrypt them, and reconstruct the email. The email application can then display the email for the user.

Figure 1:
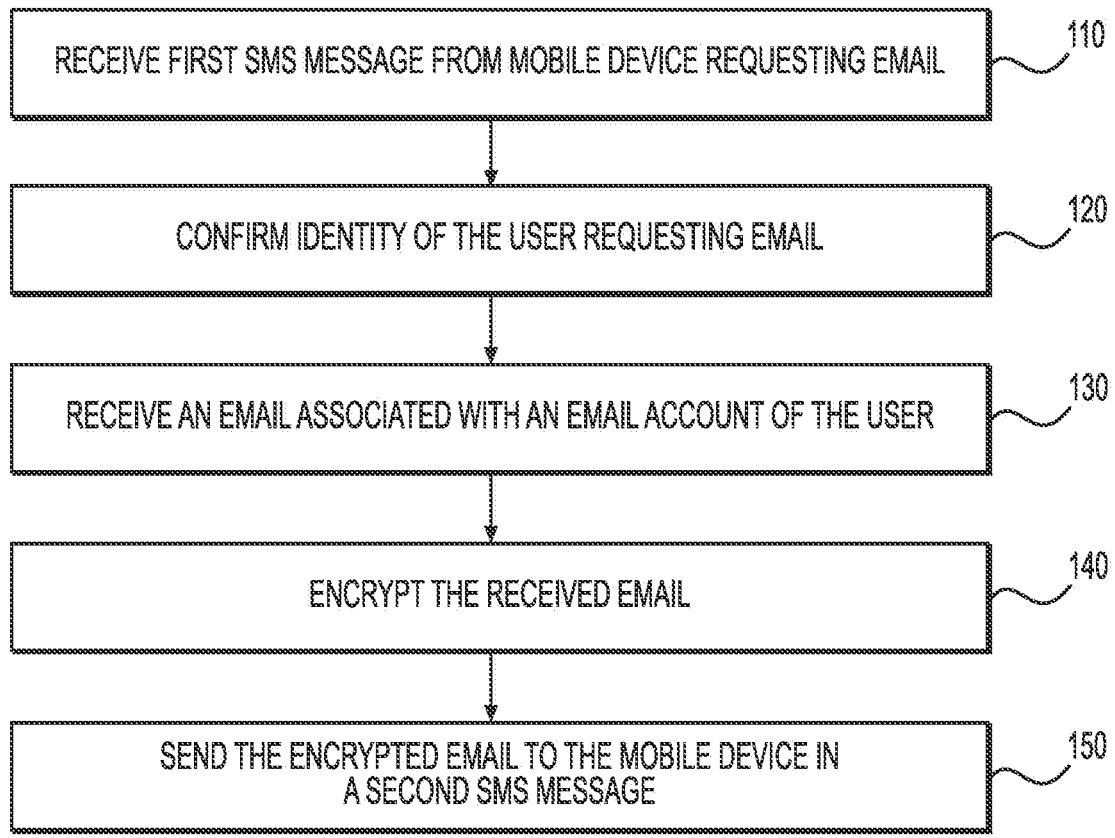
FIG. 1 is a flowchart of an exemplary method for performing email synchronization.

FIG. 1 provides a flowchart of an example method executed by a computing device, such as an email notification server. An email notification server can be a server, or group of servers, that provides email notification information to an email application. For example, when a new email is received at a user's email account, the email notification server can receive a notification of the received email and then cause a user's mobile device to display a notification regarding the email. In some examples, the email notification server can also act as an email server that sends and receives emails on behalf of the email application. In other examples, the email notification server and email server are separate computing devices.

Stage 110 can include receiving a first SMS message from a mobile device requesting email-related information. Email-related information is intended to apply broadly to any information relevant to a user's email account. A request for email-related information can include, for example, a request to download an email to a mobile device, a request to download an attachment to an email, a request to check for new emails, a request to update or change the status of an email (e.g., mark as read, flag), or a request for any other information related to emails or an email account.

The email notification server can receive the first SMS from the mobile device at stage 110. The mobile device can send the first SMS message instead of an email based on determining that the mobile device does not have adequate connectivity to perform a desired email-related action (such as checking for new emails, sending an email, or downloading new emails and attachments). For example, the email application can send the first SMS in response to the mobile device having cellular connectivity without internet connectivity. Alternatively, the email application can send the first SMS when an email below a size threshold takes more than a threshold amount of time to send, in an example. In some examples, the email application executing on the mobile device can prompt the mobile device to send the first SMS message after failing to connect to an email server. The process of generating and delivering the first SMS message is described in more detail with respect to FIG. 3A. Although described as a single SMS message, the first SMS message—or indeed, any SMS message described in this disclosure—is intended to encompass multiple SMS messages. For example, the first SMS message can be two, five, ten, or any other number of SMS messages.

The first SMS message may be encrypted using a public/private key pairing shared between the email application and the email notification server. In some examples, the email notification server stores a private key and provides the email application with a corresponding public key. The public key can be provided upon installation of the email application or at a later time and can be updated periodically to maintain security. The email application can use the public key to encrypt the first SMS message. The first SMS message can be received at the email notification server at stage 110, either directly or by being routed through an SMS gateway associated with the email notification server. The SMS gateway is discussed further with respect to FIG. 4.

In some examples, stage 110 is optional and not necessary to perform the remaining steps of the method. For example, rather than receiving a first SMS message, the email notification server can detect that the mobile device is offline based on whether the mobile device (or an application on the mobile device, such as an agent application) has checked in with email notification server or another server. A management server can monitor for check-ins and alert the email notification server when the mobile device has not checked in within a threshold period of time. In some examples, the management server or email notification server can ping the mobile device with a check-in request and determine whether the mobile device checks in with the relevant server. If the mobile device is determined to be offline, this determination can substitute for stage 110 as described above.

At stage 120, the email notification server can confirm the identity of the user requesting the email-related information. To do so, the email notification server can extract information from the first SMS message and use that information to confirm the identity of the user or to request confirmation from elsewhere, such as at an email server or identity service. The email notification server can determine a phone number associated with the first SMS message to use as a piece of information relating to the user. Additional information can be found in the SMS message itself. For example, the SMS message can include a user identification, device identification, information identifying the email application, credentials, or any combination thereof. The SMS message can also provide a second public key that corresponds to a second private key stored at the email application. The second public/private key pairing can be different from the previous public/private key pairing described earlier.

The email notification server can use the information gathered from the first SMS message to confirm the identity of the user at stage 120. In some examples, the email notification server can access a data storage location that includes information about the user. Using this information, the email notification server can validate the information from the first SMS message by matching that information to information stored at the data storage location. For example, the email notification server can look up user information associated with the phone number from which the first SMS message was sent and compare that associated information with the information from the first SMS message. In other examples, no information is required from the mobile device in order to confirm the identity of the user. The phone number for the user device and an identification of the mobile device can both be stored at the email notification server. If the email notification server determines that the mobile device is offline (based on, for example, the mobile device failing to check in or otherwise respond), the email notification server can retrieve a device identification, user identification, phone number, and any other relevant information for the mobile device from the data storage location.

In some examples, stage 120 can be performed by requesting identity confirmation from another source, such as the email server or an identity provider. In those examples, the email notification server can provide the first SMS message, or information extracted from the first SMS message, to the email server or identity provider. The email server or identity provider can then compare the received information to information stored at a storage location to confirm the user's identity.

Stage 120 can also include confirming information regarding the mobile device or email application. For example, the first SMS message can include information indicating the type of mobile device, version of operating system on the mobile device, version of the email application on the mobile device, or any other information about the device. This information can be compared to a profile stored at the email notification server or elsewhere, with the method continuing only if the mobile device or email application meets any applicable requirements. In some examples, the email notification server can confirm that the mobile device is compliant with a management server before continuing to the next stage of the method.

After confirming the identity of the user requesting email at stage 120, the email notification server can receive an email associated with the email account of the user at stage 130. To do so, the email notification server can request the email from the email server. The email notification server can make a general request to the email server by requesting all email updates to the user's email account. The email server, in turn, can provide any new emails to the email notification server.

At stage 140, the email notification server can encrypt an email message received from the email server at stage 130. The encryption can be performed using the second public key that was provided in the first SMS message, for example. The encryption process can also include various steps relating to encrypting, packaging, and marking the encrypted email, as described with respect to FIGS. 2, 3A, and 5.

At stage 150, the email notification server can send the encrypted email to the mobile device in a second SMS message. The email notification server can send the second SMS message directly or use an SMS gateway to send it. As with the first SMS message, the second SMS message can include multiple messages and is not limited in number. In this way, the second SMS message can be multiple SMS messages used to convey the entire email.

Figure 2:
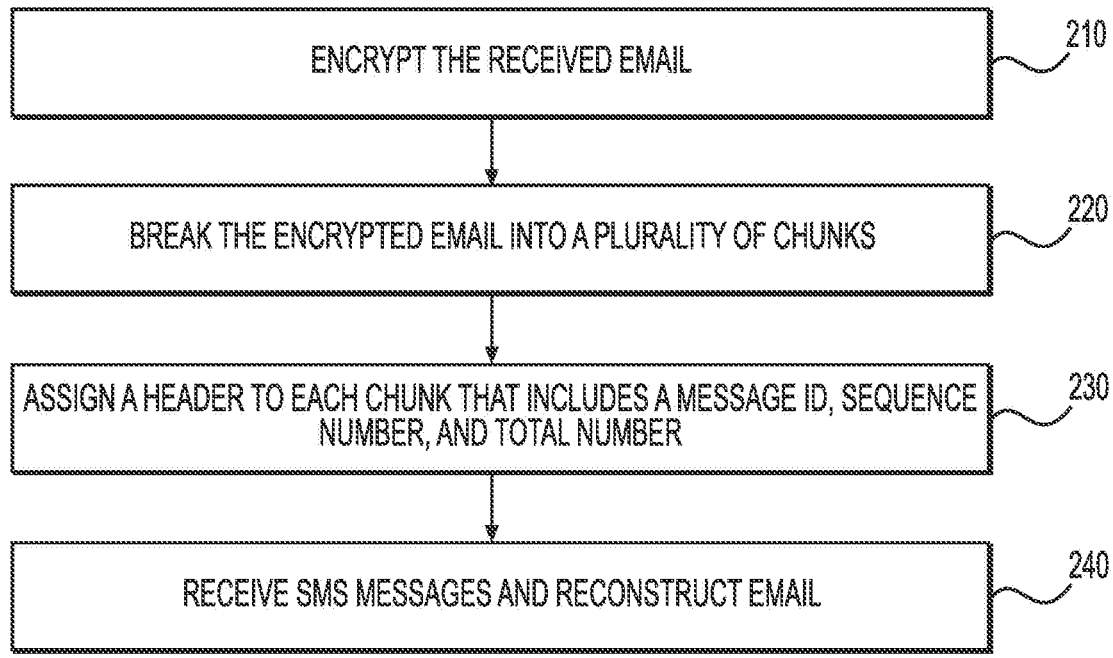
FIG. 2 is a flowchart of an exemplary method for performing email synchronization.

FIG. 2 provides a flowchart of an example method for encrypting and sending the second SMS message described in FIG. 1. At stage 210 of the method, the email notification server can encrypt the email received from the email server at stage 130 of FIG. 1. This can include, for example, using a public key provided in the first SMS message from the mobile device. The mobile device can retain a corresponding private key, allowing it to decrypt the encrypted email.

Due to character limitations for SMS messages, the encrypted email may be too large to send in a single SMS message. In that scenario, stage 220 can include breaking the encrypted email into a plurality of messages, referred to throughout the disclosure as "chunks." In some examples, the email notification server can determine a number of chunks by calculating the overall length of the encrypted email and dividing that number by the number of characters available in each SMS message. In this example, the number of characters available in each SMS message can be less than the maximum number of characters allowed in each SMS message. For example, a number of characters can be reserved for a header to be added to each SMS message at stage 230.

In one example, the encrypted email is 1,380 characters. The email notification server can choose to reserve 50 characters of each SMS message for a corresponding header. The character limit for an SMS message in this example is 160 characters. Using these numbers, the email notification server can calculate that each SMS message includes 110 available characters. Dividing the total number of characters of the encrypted email (1,380) by the available characters of each SMS message (110) gives a result of approximately 12.54. Based on this result, the email notification server can break the encrypted email into 13 chunks, with each chunk retaining 50 characters to be used as a header.

In some examples, the email notification server can construct one or more of the headers before calculating the number of chunks required. The email notification server can construct the headers to determine their precise length before performing the determinations described in the previous paragraph. In one example, the email notification server calculates a header length of 58 characters. With a maximum character limit of 160, that leaves 102 characters available in each SMS message. Dividing the total number of characters of the encrypted email (1,380) by the available characters of each SMS message (102) gives a result of approximately 13.53. Based on this result, the email notification server can break the encrypted email into 14 chunks.

In some examples, the header length can vary from one chunk to another. The email notification server can calculate the number of chunks required by creating the first header and calculating the available characters that would remain in that SMS message, then creating a second header and calculating the available characters in the corresponding SMS message, and so on, until the total available characters exceeds the total number of characters of the encrypted email.

At stage 230, the email notification server can assign a header to each chunk. This can be performed before or after breaking the encrypted email into chunks at stage 220, as described above. Each header can include various information that can allow the email application to reconstruct the email at the mobile device. For example, the header can include a message identification that identifies a particular email message to which the chunk applies. Using a message identification can allow the email notification server to send chunks corresponding to multiple emails, in any order, while still allowing the email application to identify a particular email message for each chunk. The header can also include a sequence number that identifies the sequence of chunks for a given message. In some cases, SMS messages can be delivered in a different order than they were sent. By labeling each chunk with a sequence number, the email application has the information necessary to order the chunks in a correct orientation. The header can also include a total number of chunks, allowing the email application to know whether an email message was fully or only partially received.

At stage 240, the mobile device can receive the SMS messages (referred to in FIG. 1 as the "second SMS message") and reconstruct the email. The reconstruction can be performed by the email application, for example. This stage can include identifying all chunks having matching message identifications, indicating that those chunks apply to the same email message. This stage can also include ordering the chunks according to their sequence number identified in the respective headers. The email application can also confirm that all chunks have been received by confirming that the sequence numbers run consecutively up to the total number of chunks. If any chunks are missing, the email application can notify the email notification server by sending a third SMS message identifying what has been received or identifying a problem with the transmission.

Before or after confirming that all chunks have been received and combining those chunks according to their sequence numbers, the email application on the mobile device can decrypt the email using a private key corresponding to the public key with which the email was encrypted. In some examples, the public key is provided to the email notification server in the first SMS message described in stage 110 of FIG. 1. If the sequence numbers and total chunk numbers were encrypted by the email notification server, then the decryption process can occur before confirming that all chunks have been received. If those portions of the chunks are not encrypted, then the confirmation can occur before decrypting the remainder of the chunks.

After decrypting the email, the email application can display the email message in the application in a similar manner to other email messages received using different means. In some examples, the email application can cause the SMS messages to be marked as read or can cause the operating system of the mobile device to not display notifications relating to the second SMS message.

Figure 3A:
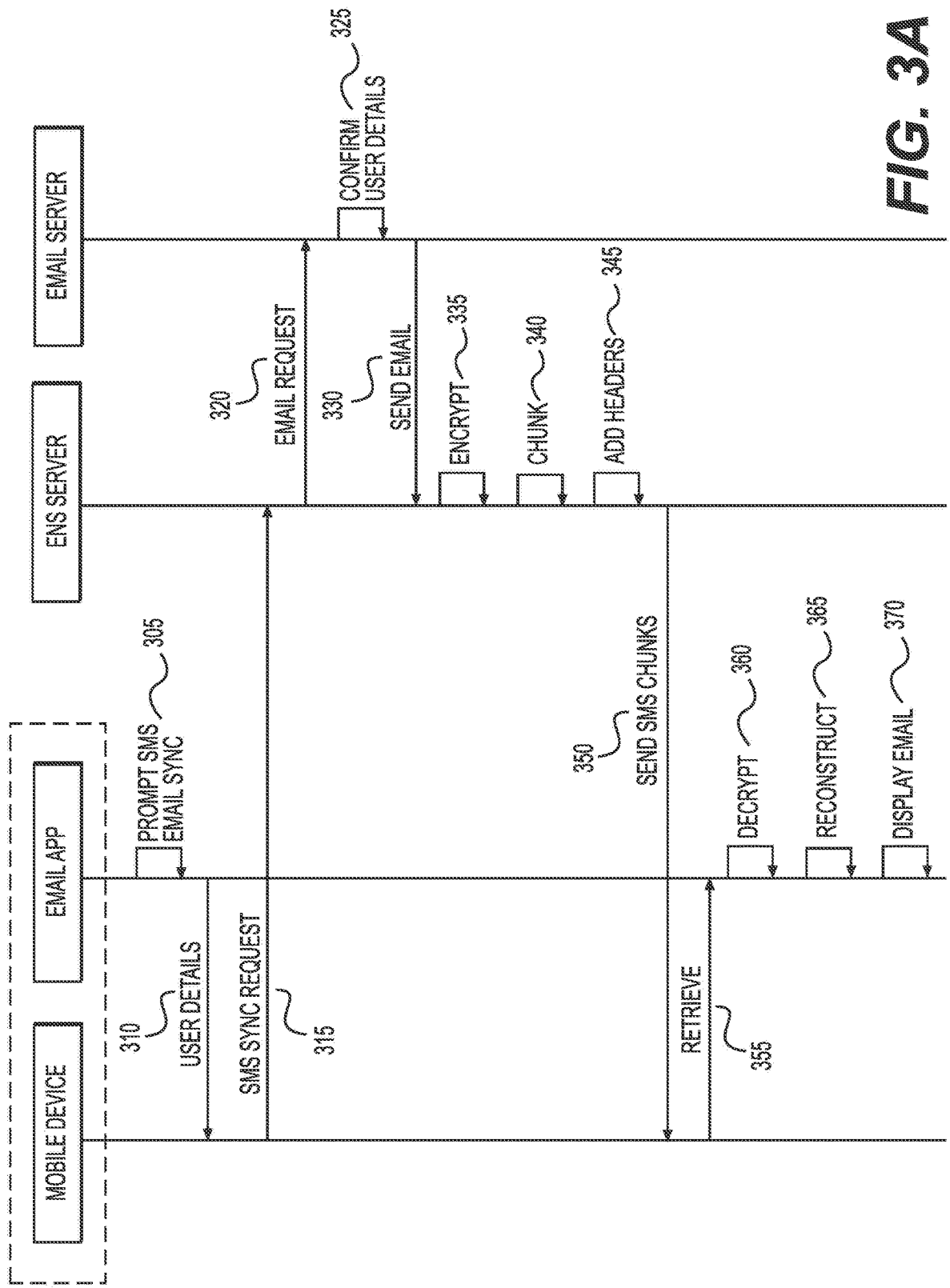
FIG. 3A is a sequence diagram of an exemplary method for performing email synchronization.

FIG. 3A provides a sequence diagram of an exemplary method for performing email synchronization. At stage 305, the email application can prompt the user to use SMS to synchronize the email application with the user's email account. The prompt can be presented in response to receiving a request from the user to update the email application, such as by performing an action that synchronizes the email application (for example, performing a gesture at the inbox interface), or by launching the email application or cycling it from the background to foreground of the operating system. In some examples, the SMS prompt at stage 305 can be performed based on receiving an indication that a new email is available at the email server.

The user can accept the prompt at stage 305 by selecting a graphical element, such a button labeled "yes" or "check email via SMS." In response to that selection, the email application can initiate the process of synchronizing the user's email. At stage 310, for example, the email application can provide user details to the mobile device. The details provided at stage 310 can include details necessary for sending an SMS sync request at stage 315. This can include, for example, providing instructions to send an SMS message and providing instructions for the content of that SMS message.

For example, the content to be included in the SMS message can include an encryption key for encrypting any return emails, a user identification, and a device identification. In some examples, the content also includes an identification of the type and version of the email application executing on the mobile device, an identification of the type and version of operating system on the mobile device, and any relevant information about the device (such as the connectivity status, battery level, or geographic location). The content can also include authentication information, such as tokens or certificates needed to authenticate with the email notification server, email server, or both.

In some examples, stage 305 is optional or not included in the method. For example, rather than prompt the user to use SMS to synchronize the email application, the email application can automatically use SMS synchronization based on determining that the mobile device is offline. This can provide a more seamless user experience and eliminate unnecessary button presses when checking email offline.

The content of the SMS message can be encrypted by the email application before being provided at stage 310. For example, the email application can use a public key to encrypt the information. The public key can be part of a public/private key pairing shared between the email application and the email notification server. This pairing, described herein at the "first public/private key pairing," "first public key," and "first private key," can be used to encrypt information sent from the mobile device to the email notification server. In some examples, the email notification server stores a first private key and provides the email application with a corresponding first public key. The first public key can be provided upon installation of the email application or at a later time and can be updated periodically to maintain security. The content of the SMS message can include a second public key, where a corresponding second private key is maintained by the email application. These two pairs of public/private keys can be used to encrypt communications in both directions between the email application and email notification server.

After assembling the content to be transmitted to the email notification server and encrypting it with the first public key, the encrypted content can be handed off to a messaging application or feature of the mobile device at stage 310. At stage 315, the mobile device can send a first SMS message to the email notification server. As explained previously, the "first SMS message" can include multiple SMS messages. This is especially true in situations where the email application is providing various types of information and encrypting all of that information, resulting in a message too long for a single SMS. In some examples, the messaging application or feature of the mobile device breaks the first SMS message into multiple messages that do not exceed the character limit in place at that time. In other examples, the email application breaks the first SMS message into multiple messages and requests that the messaging application or feature send each of those pieces of the first SMS message. The email application can add headers to the various messages in that example, allowing the email notification server to reconstruct the full message on the other end.

The email notification server can receive the SMS-based synchronization request at stage 315. The email notification server can receive SMS messages at an SMS gateway associated with the email notification server. In some examples, the SMS gateway is a software application controlled by a processor of the email notification server. In other examples, the SMS gateway is a separate device that communicates with the email notification server. The SMS gateway can be associated with a phone number that is known to the email application. The first SMS message can be transmitted from the mobile device to the phone number associated with the SMS gateway. The SMS gateway can pass the first SMS message to the email notification server as part of stage 315.

At stage 320, the email notification server can decrypt the first SMS message and extract relevant information from it. The decryption can be performing using the first private key stored at the email notification server, corresponding to the first public key with which the first SMS message was encrypted. The email notification server can request an email synchronization from the email server at stage 320. This request can be sent after confirming the user details at the email notification server in one example. In another example, confirming the user details can be performed at stage 325 by the email server.

Confirming the user details at stage 320 or 325 can include confirming the identity of the user requesting the email-related information. For example, the email notification server or email server can compare information extracted from the first SMS message with information stored at a storage location. The stored information can include, for example, a record associating a phone number, user identification, and device identification with one another. Of course, additional information can also be associated with those items in the storage location. This can include, for example, identifications of any devices associated with the user and credentials associated with the user. Confirming the user details can include comparing one of more of the extracted pieces of information (such as the phone number from which the first SMS message was sent and the user identification) to the stored information. If the information matches, the user's identity can be confirmed for the purposes of email synchronization.

If the confirmation was performed by the email notification server at stage 320, then the email server can skip stage 325 and respond to the email request by sending one or more emails at stage 330. If the confirmation was performed by the email server at stage 320, then it can continue to stage 330 and respond to the email request by sending one or more emails to the email notification server. In some examples, the email server provides any "new" emails at stage 330, where a new email is any email that has not yet been received by the email application. In other examples, a new email is any email after a particular cutoff time specified by the email notification server. The cutoff time can correspond to the last email synchronization performed by the email application.

The email notification server can receive any new emails at stage 330 and encrypt those emails at stage 335. The email notification server can choose to send the entire email message, or only a portion of the email message. For example, if the email message includes a string of multiple previous replies, the email notification server may choose to only send the most recent two or three emails of the chain. In another example, the email notification server can choose to omit attachments, or can simply add a text indication at the end of the email indicating the file name and file type of the attachment.

The encryption can be performed by utilizing the second public key that was received with the first SMS message at stage 315. Based on the length of the encrypted email, the email notification server can "chunk" the encrypted email by breaking it into smaller pieces, or chunks, at stage 340. In some examples, the email notification server can determine a number of chunks by calculating the overall length of the encrypted email and dividing that number by the number of characters available in each SMS message. In this example, the number of characters available in each SMS message can be less than the maximum number of characters allowed in each SMS message. For example, a number of characters can be reserved for a header to be added to each SMS message at stage 345.

In some examples, the header length can vary from one chunk to another. The email notification server can calculate the number of chunks required by creating the first header and calculating the available characters that would remain in that SMS message, then creating a second header and calculating the available characters in the corresponding SMS message, and so on, until the total available characters exceeds the total number of characters of the encrypted email.

At stage 345, the email notification server can assign a header to each chunk. This can be performed before or after breaking the encrypted email into chunks at stage 220, as described above. Each header can include various information that can allow the email application to reconstruct the email at the mobile device. For example, the header can include a message identification that identifies a particular email message to which the chunk applies. Using a message identification can allow the email notification server to send chunks corresponding to multiple emails, in any order, while still allowing the email application to identify a particular email message for each chunk. The header can also include a sequence number that identifies the sequence of chunks for a given message. In some cases, SMS messages can be delivered in a different order than they were sent. By labeling each chunk with a sequence number, the email application has the information necessary to order the chunks in a correct orientation. The header can also include a total number of chunks, allowing the email application to know whether an email message was fully or only partially received.

At stage 350, the email notification server can send the various chunks (collectively referred to as the "second SMS message") to the mobile device. The SMS chunks can be received at a messaging application or feature of the mobile device. In some examples, this is the same messaging application or feature used to send the first SMS message at stage 315. These chunks can be retrieved by the email application at stage 355. In some examples, the email application can access the messaging application directly and retrieve the messages. In other examples, the email application can request the messages from the messaging application, either directly or by communicating with the operating system executing on the mobile device.

In some examples, the email application can cause the messaging application to hide the messages associated with the SMS chunks from stage 350, such as by deleting them from the messaging application after retrieval at stage 355. In an example, the email application can cause the messaging application to mark the messages associated with SMS chunks as read, so they do not continue to show a notification to the user. In another example, the email application can intercept the SMS chunks before they are displayed by the messaging application, marking them as read to prevent notifications or even preventing them from ever being displayed in the messaging application.

After obtaining the chunks at stage 355, the email application can decrypt each chunk at stage 360. The decryption process can be performed using a private encryption key, such as the second private encryption key corresponding to the second public encryption key that was provided to the email notification server at stage 315. The decrypted chunks can be combined at stage 365 to reconstruct the original email.

The reconstruction process can include extracting information from the headers of each chunk to determine whether all of the chunks have been received, the particular email to which each chunk is associated, and the sequence of the chunks for a particular email. In some examples, stage 365 includes, first, confirming that all chunks have been received. This can be performed by confirming that the sequence numbers of each chunk run consecutively up to the indicated total number of chunks. If any chunks are missing, the email application can notify the email notification server by sending a third SMS message identifying what has been received or identifying a problem with the transmission.

Stage 365 can include extracting the body portion of each chunk (i.e., the non-header portion of the message) and ordering them according to their sequence number and message identification. The resulting combination should reflect the original email, or at least the portion of the original email that was sent by the email notification server at stage 350.

At stage 370, the email application can display the reconstructed email for the user. The reconstructed email can look indistinguishable, to the user, from an email received in the default manner (such as by receiving the full email directly from the email server). In other examples, the reconstructed email can include information informing the user that the email was received through SMS or that it is missing certain subject matter. For example, if the email was truncated to omit some of the previous replies in a long email chain, the email displayed at stage 370 can include a message alerting the user that additional replies exist in the full version of the email message, and that the user needs an improved connection with the email server to download the full version. The email can also display a message indicating that one or more attachments exist, including their names, file types, and file sizes.

Figure 3B:
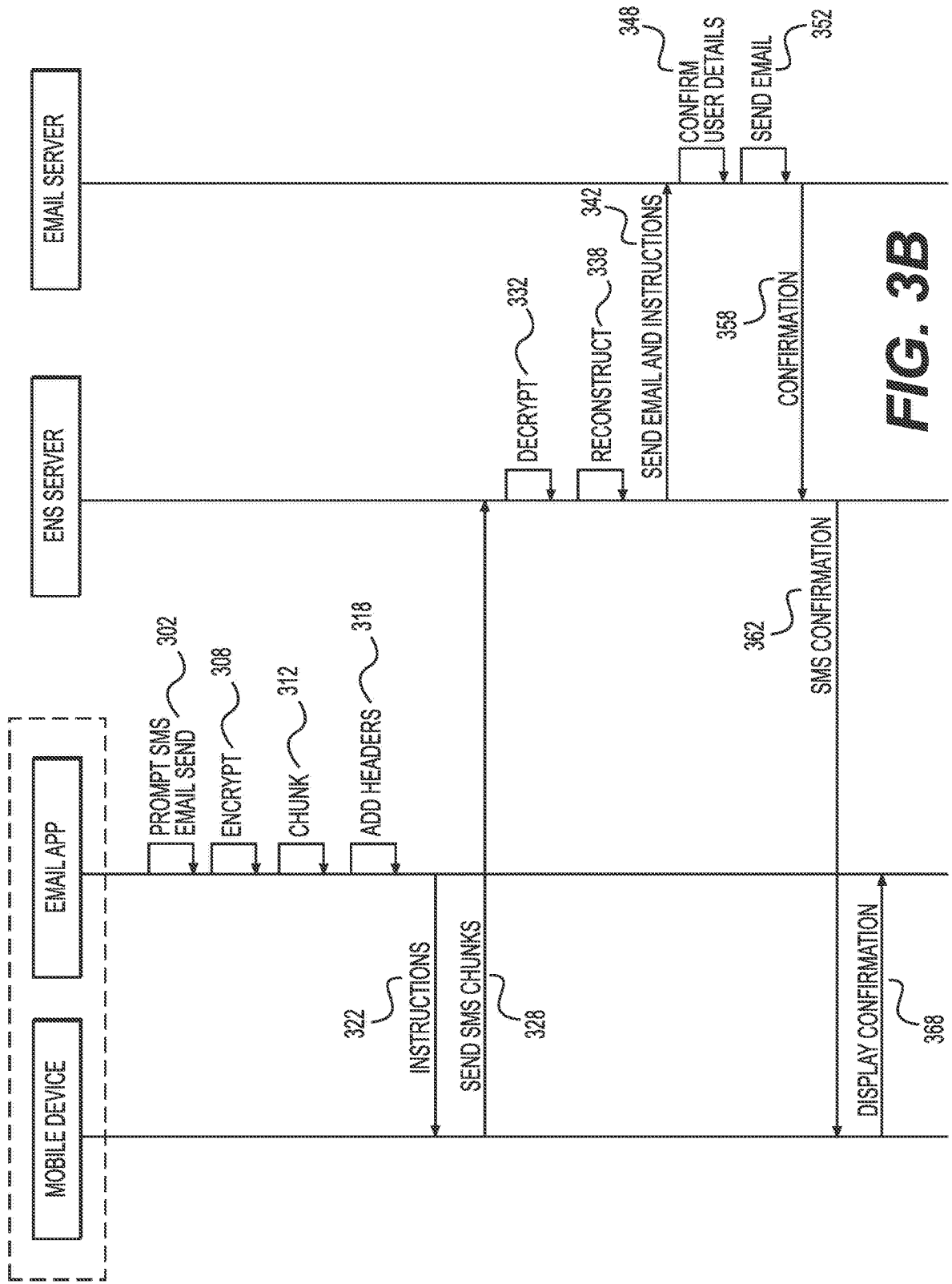
FIG. 3B is a sequence diagram of an exemplary method for performing email synchronization.

The email application can use similar functionality to send an email message when connectivity does not allow for sending the message in full directly to the email server. Turning to FIG. 3B, at stage 302 the email application can prompt the user to elect to send the email using SMS. The prompt can be displayed in response to the user selecting to send an email message when the device does not have sufficient connectivity. In some examples, the prompt is displayed in response to an unsuccessful attempt to send an email in the default manner. The prompt can indicate that the email was unable to be sent and ask the user if he or she would like to attempt to send the email using SMS. The prompt can also include a warning that standard messaging rates may apply to the SMS transmissions.

If the user elects to proceed, the email application encrypt the email at stage 308. The email application can use a public encryption key provided by the email notification server, such as the first public key described earlier, to perform the encryption at this stage. The encrypted email message can then be chunked at stage 312 in a manner similar to that described with respect to stage 340 of FIG. 3A. In some examples, the email application can determine a number of chunks by calculating the overall length of the encrypted email and dividing that number by the number of characters available in each SMS message. In this example, the number of characters available in each SMS message can be less than the maximum number of characters allowed in each SMS message. For example, a number of characters can be reserved for a header to be added to each SMS message at stage 318.

In some examples, the header length can vary from one chunk to another. The email application can calculate the number of chunks required by creating the first header and calculating the available characters that would remain in that SMS message, then creating a second header and calculating the available characters in the corresponding SMS message, and so on, until the total available characters exceeds the total number of characters of the encrypted email.

At stage 318, the email notification server can assign a header to each chunk. This can be performed before or after breaking the encrypted email into chunks at stage 312, as described above. Each header can include various information that can allow the email notification server to reconstruct the email upon receiving the various encrypted chunks. For example, the header can include a message identification that identifies a particular email message to which the chunk applies and a sequence number that identifies the sequence of chunks for a given message. In some cases, SMS messages can be delivered in a different order than they were sent. By labeling each chunk with a sequence number, the email notification server will have the information necessary to order the chunks in a correct orientation. The header can also include a total number of chunks, allowing the email notification server to know whether an email message was fully or only partially received. In some examples, one or more headers include instructions for the email notification server to send the email to one or more recipients.

At stage 322, the email application can provide instructions to the mobile device to send the chunks to the email notification server. For example, the email application can provide a phone number associated with an SMS gateway accessible to the email notification server. It can also provide the various chunks to be sent and instruct the mobile device, or a messaging application of the mobile device, to send those chunks as SMS messages to the number associated with the SMS gateway. The mobile device can then use its messaging application to send the chunks at stage 328. The chunks can be received at the email notification server or at an SMS gateway associated with the email notification server.

At stage 332, the email notification server can decrypt each SMS chunk. The decryption process can be performed using a private encryption key that corresponds to the public encryption key used to encrypt the chunks at stage 308. The decrypted chunks can be analyzed and combined at stage 338 to reconstruct the original email. The reconstruction process can include extracting information from the headers of each chunk to determine whether all of the chunks have been received, the particular email to which each chunk is associated, and the sequence of the chunks for a particular email. In some examples, stage 338 includes, first, confirming that all chunks have been received. This can be performed by confirming that the sequence numbers of each chunk run consecutively up to the indicated total number of chunks. If any chunks are missing, the email notification server can notify the email application by sending a separate SMS message identifying what has been received or identifying a problem with the transmission.

Stage 338 can also include extracting the body portion of each chunk (i.e., the non-header portion of the message) and ordering them according to their sequence number and message identification. The resulting combination should reflect the original email, or at least the portion of the original email that was sent by the email application at stage 328.

At stage 342, the email notification server can provide the reconstructed email to the email server. If necessary, the email notification server can also provide instructions regarding sending the email, such as by identifying a sender and recipient. In some examples, the email and instructions received by the email server at stage 342 have a similar format used when the email notification server forwards an email received in a default manner. In other words, the email server can be blind to the methods used to transmit the email from the user device to the email notification server.

Stage 348 can include confirming the identity of the user requesting the email-related information. In some examples, this stage is performed by the email notification server before sending the email and instruction at stage 342. In other examples, this stage is performed by the email server based on the information received from the email notification server at stage 342. The email notification server or email server can compare information extracted from the with information stored at a storage location. The stored information can include, for example, a record associating a phone number, user identification, and device identification with one another. Additional information can also be associated with those items in the storage location. This can include, for example, identifications of any devices associated with the user and credentials associated with the user. Confirming the user details can include comparing one of more of the extracted pieces of information (such as the phone number from which the SMS chunks were sent and the user identification) with the stored information. If the information matches, the user's identity can be confirmed for the purposes of email synchronization.

In one example, if the confirmation of user details was performed by the email notification server at stage 342, then the email server can skip stage 348 and send the email at stage 352. Otherwise, the confirmation of user details can be performed by the email server at stage 348 and the email can be sent at stage 352. The email server can notify the email notification server that the email was sent at stage 358. The email notification server, in turn, can send an SMS message to the mobile device at stage 362 to confirm that the email has been sent. The email application on the mobile device can display a confirmation for the user at stage 368.

Figure 4:
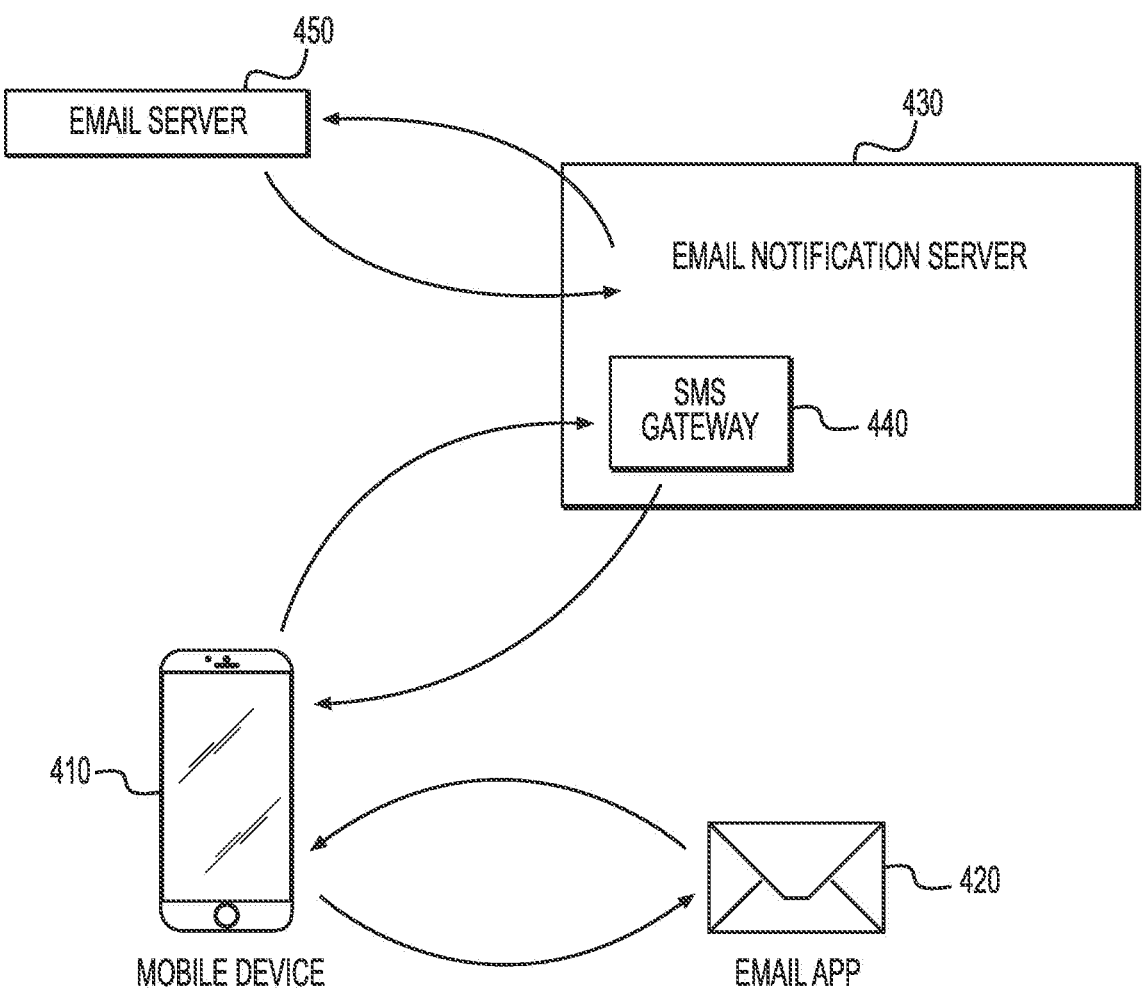
FIG. 4 is a system diagram of an exemplary system for performing email synchronization.

FIG. 4 depicts a system with components for performing the various methods, processes, and stages described above. The system can include a mobile device 410. The mobile device 410 can be any type of computing device, such as a phone, tablet, watch, laptop, or desktop computer. The mobile device 410 can include a hardware processor and memory storage. It can also communicate via a network, such as the internet, in wired or wireless fashion, using one or more components associated with the device 410. The mobile device 410 can include or more email applications 420, include one or more third-party email clients that are not developed by the device manufacturer. An example of an email application 420 is VMWARE's BOXER application.

The email application 420 can execute on the mobile device 410 and can have permissions to cause the mobile device 410 to, for example, send SMS messages on behalf of the email application 420 as described above. The email application 420 can perform various actions, such as those described with respect to stages 305, 360, 365, and 370 of FIG. 3A and stages 302, 308, 312, and 318 of FIG. 3B. The email application 420 can present a user interface to a user of the mobile device 410 upon which emails are displayed. The email application 420 can perform the various stages described herein without deviating from its standard user interface—in other words, emails sent through SMS message can be displayed in the email application 420 in a seamless manner, without alerting the user to any technical issues occurring behind the scenes. In some examples, however, the email application 420 can provide notifications to the user that an email has been sent or received using SMS messages.

The mobile device 410 can communicate with an SMS gateway 440. The SMS gateway 440 can be a service for sending and receiving SMS messages. The SMS gateway 440 can be a software service that runs on a hardware device, such a server. The server can be an email notification server 430, as shown in FIG. 4, or it can be a separate server remote from the email notification server 430. The SMS gateway 440 can be associated with one or more phone numbers, such that an SMS message transmitted to any of those numbers would be transmitted to the SMS gateway 440 through a cellular network.

The SMS gateway 440 can send and receive messages on behalf of the email notification server 430. For example, the SMS gateway 440 can be configured to communicate any received SMS messages to a processor of the email notification server 430. To communicate a received SMS message, the SMS gateway 440 can create a file having a format familiar to the email notification server 430. The file can include relevant information about the received SMS message, including the content of the message, the time it was received, and the phone number from which it was received. Similarly, the email notification server 430 can provide a file to the SMS gateway 440 that includes a destination phone number and content for the message, and the SMS gateway 440 can generate one or more SMS messages to transmit that content to the identified phone number.

The email notification server 430 can be a single server or a network of servers that include one or more processors and memory storage locations. The email notification server 430 can also include one or more databases that are accessible to the email notification server 430. The email notification server 430 can communicate directly with the mobile device 410, such as by transmitting email-notification information to the mobile device 410. The email notification server 430 can utilize notification-service tokens, such APNS (APPLE NOTIFICATION SERVICE) tokens, to authenticate applications and devices. The email notification server 430 can receive email-account updates from the email server 450, generate notifications based on those updates, and transmit those updates to the mobile device 410. The email notification server 430 can also perform the tasks described herein, such as tasks associated with stages 320, 330, 335, 340, 345, and 350 of FIG. 3A and stages 328, 332, 338, 342, 358, and 362 of FIG. 3B.

The email notification server 430 can include permissions allowing it to communicate with the email server 450. The email server 450 can include one or more physical hardware servers that store email information for the user's email account. For example, the one or more servers can include a username and password, a database storing the emails associated with the user's account, and various settings for the account. In one example, the email server 450 is a MICROSOFT EXCHANGE server, a MICROSOFT EXCHANGE WEB SERVICES server, or a combination of both. The email server 450 can deliver emails directly to the mobile device 410, or it can deliver emails to the email notification server 430 to be delivered to the mobile device 410. In some examples, the email server 450 stores new emails until the mobile device 410 or email notification server 430 reaches out to the email server 450 to request an email synchronization, at which point new emails can be transmitted to the device 410 or email notification server 430.

Figure 5:
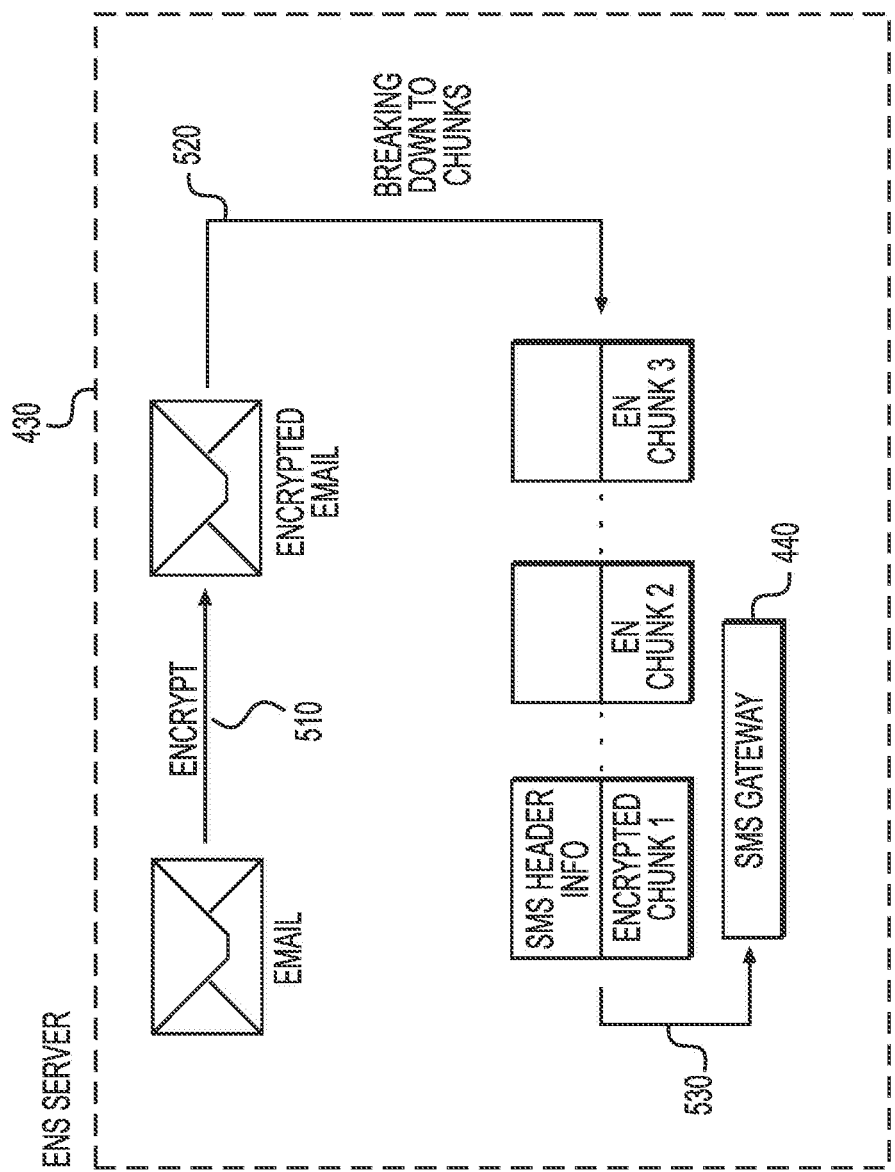
FIG. 5 is a flowchart of an exemplary method for performing email synchronization.

FIG. 5 provides a flowchart of a method being performed by the email notification server 430. The method can be performed based on the email notification server 430 receiving an email to be delivered to the mobile device 410 through SMS messages. The email notification server 430 can determine that SMS messages are necessary based on attempting to transmit the email to the mobile device 410 directly or based on an indication from the email server 450 of an unsuccessful transmission.

At stage 510, the email notification server 430 can encrypt the email to obtain an encrypted email. The encryption can be performed by utilizing a public encryption key corresponding to a private encryption key stored at the email application 420, for example. Based on the length of the encrypted email, the email notification server 430 can break the encrypted email into smaller pieces, or chunks, at stage 520. In some examples, the email notification server 430 can determine a number of chunks by calculating the overall length of the encrypted email and dividing that number by the number of characters available in each SMS message. In this example, the number of characters available in each SMS message can be less than the maximum number of characters allowed in each SMS message. For example, a number of characters can be reserved for a header to be added to each SMS message.

In the example of FIG. 5, the encrypted email is separated into three chunks, with each chunk including unique header information. Each header can include various information that can allow the email application 420 to reconstruct the email at the mobile device 410. For example, the header can include a message identification that identifies a particular email message to which the chunk applies. Using a message identification can allow the email notification server 430 to send chunks corresponding to multiple emails, in any order, while still allowing the email application 420 to identify a particular email message for each chunk. The header can also include a sequence number that identifies the sequence of chunks for a given message. In some cases, SMS messages can be delivered in a different order than they were sent. By labeling each chunk with a sequence number, the email application 420 has the information necessary to order the chunks in a correct orientation. The header can also include a total number of chunks, allowing the email application 420 to know whether an email message was fully or only partially received.

At stage 530, the various chunks can be provided to the SMS gateway 440 to be transmitted to the mobile device 410. The SMS gateway 440 can send each chunk as a separate SMS message to the mobile device 410. The SMS gateway 440 can send the SMS messages from a phone number associated with the gateway 440 and known to the mobile device 410 or email application 420, or both. The mobile device 410 can receive the messages, decrypt them, and reconstruct and display the email, as described with respect to stages 360, 365, and 370 of FIG. 3A, for example.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather, any feature of any example described here can be incorporated into any other suitable example. It is intended that the specification and examples be considered as exemplary only, with a true scope and spirit of the disclosure being indicated by the following claims.

What is claimed is:

1. A mobile device executing an email application that performs stages for synchronizing email, the stages comprising:
   determining that the mobile device failed to connect to an email notification server;
   based on the determination, sending, from the mobile device to the email notification server, a first SMS message requesting email synchronization;
   receiving, at the mobile device, a second SMS message that includes an encrypted email;
   decrypting the second SMS message at the mobile device; and
   displaying at least a portion of the decrypted second SMS message at the mobile device.

2. The mobile device of claim 1, wherein the first SMS message is generated and encrypted by an email application executing on the mobile device.

3. The mobile device of claim 1, wherein the first SMS message is transmitted by the mobile device based on a lack of connectivity sufficient to synchronize the email in a default manner.

4. The mobile device of claim 1, wherein the encrypted email is an encrypted version of an email received at the email notification server from an email server based on the email server confirming that the user identification and phone number match records for the user of the mobile device.

5. The mobile device of claim 1, wherein receiving the second SMS message includes receiving a plurality of SMS messages that contain chunks of the encrypted email, and wherein the stages further comprise decrypting the chunks and combining the chunks for display at the mobile device.

6. The mobile device of claim 5, wherein each of the chunks of the encrypted email comprises:
   a message identification that indicates an email message to which the chunk applies;
   a sequence number assigned to the chunk; and
   a total number of chunks for the email message.

7. The mobile device of claim 1, wherein the first SMS message comprises a public key to be used for encrypting the received email.

8. A method performed by a mobile device executing an email application, the method comprising:
   determining that the mobile device failed to connect to an email server;

based on the determination, sending, from the mobile device to the email notification server, a first SMS message requesting email synchronization;

receiving, at the mobile device, a second SMS message that includes an encrypted email;

decrypting the second SMS message at the mobile device; and displaying at least a portion of the decrypted second SMS message at the mobile device.

9. The method of claim 8, wherein the first SMS message is generated and encrypted by an email application executing on the mobile device.

10. The method of claim 8, wherein the first SMS message is transmitted by the mobile device based on a lack of connectivity sufficient to synchronize the email in a default manner.

11. The method of claim 8, wherein the encrypted email is an encrypted version of an email received at the email notification server from an email server based on the email server confirming that the user identification and phone number match records for the user of the mobile device.

12. The method of claim 8, wherein receiving the second SMS message includes receiving a plurality of SMS messages that contain chunks of the encrypted email, and wherein the stages further comprise decrypting the chunks and combining the chunks for display at the mobile device.

13. The method of claim 12, wherein each of the chunks of the encrypted email comprises:

a message identification that indicates an email message to which the chunk applies;

a sequence number assigned to the chunk; and a total number of chunks for the email message.

14. The method of claim 8, wherein the first SMS message comprises a public key to be used for encrypting the received email.

15. A non-transitory, computer-readable medium comprising instructions that, when executed by a hardware processor of a mobile device, causes the mobile device to perform stages comprising:

determining that the mobile device failed to connect to an email notification server;

based on the determination, sending, from the mobile device to the email notification server, a first SMS message requesting email synchronization;

receiving, at the mobile device, a second SMS message that includes an encrypted email;

decrypting the second SMS message at the mobile device; and displaying at least a portion of the decrypted second SMS message at the mobile device.

16. The non-transitory, computer-readable medium of claim 15, wherein the first SMS message is generated and encrypted by an email application executing on the mobile device.

17. The non-transitory, computer-readable medium of claim 15, wherein the first SMS message is transmitted by the mobile device based on a lack of connectivity sufficient to synchronize the email in a default manner.

18. The non-transitory, computer-readable medium of claim 15, wherein the encrypted email is an encrypted version of an email received at the email notification server from an email server based on the email server confirming that the user identification and phone number match records for the user of the mobile device.

19. The non-transitory, computer-readable medium of claim 15, wherein receiving the second SMS message includes receiving a plurality of SMS messages that contain chunks of the encrypted email, and wherein the stages further comprise decrypting the chunks and combining the chunks for display at the mobile device.

20. The non-transitory, computer-readable medium of claim 19, wherein each of the chunks of the encrypted email comprises:

a message identification that indicates an email message to which the chunk applies;

a sequence number assigned to the chunk; and a total number of chunks for the email message.

\* \* \* \* \*